United States Patent [19]

Winter

[11] 3,867,383

[45] Feb. 18, 1975

[54] MONOANTHRANILATOANILINO-s-TRIAZINES

[75] Inventor: Roland A. E. Winter, Armonk, N.Y.

[73] Assignee: Ciba-Giegy Corporation, Ardsley, N.Y.

[22] Filed: Apr. 12, 1973

[21] Appl. No.: 350,566

Related U.S. Application Data

[63] Continuation-in-part of Ser. No. 129,126, March 29, 1971, abandoned.

[52] U.S. Cl............. 260/249.6, 260/249.9, 424/249
[51] Int. Cl. ....................... C07d 55/22, C07d 55/20
[58] Field of Search...................... 260/249.6, 249.9

[56] References Cited
UNITED STATES PATENTS
3,530,127  9/1970  Biland et al.................. 260/249.9 X

*Primary Examiner*—John M. Ford
*Attorney, Agent, or Firm*—Nestor W. Shust

[57] ABSTRACT

Compounds having the formula

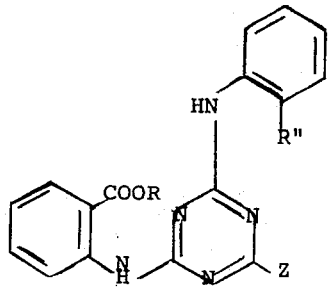

which can be used as cardiovascular agents or in preparing diazo compounds.

4 Claims, No Drawings

MONOANTHRANILATOANILINO-s-TRIAZINES

This application is a continuation-in-part of copending application Ser. No. 129,126, filed Mar. 29, 1971, now abandoned.

DETAILED DESCRIPTION

This invention relates to novel monoanthranilatoanilino-s-triazine compounds. These compounds can be represented by the formula

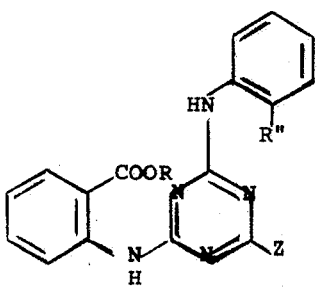

wherein R is hydrogen or a lower alkyl group,

Z is phenyl or $-NR'_2$ where $R'$ is a lower alkyl group, and $R''$ is hydrogen or $-COOR$.

By lower alkyl groups is meant straight or branched chain alkyl groups having up to six carbon atoms such as methyl, ethyl, propyl, isopropyl, butyl, sec-butyl, tert-butyl, amyl, tert-amyl, hexyl and the like.

The compounds of this invention are useful as cardiovascular agents, and particular, as blood pressure lowering agents or as coronary and peripheral vascular dilation agents. When used in this capacity, they may be administered parenterally or orally in any of the usual pharmaceutical forms including tablets, capsules, powders, suspensions, solutions, syrups and the like.

The following examples will further illustrate the nature of the present invention without introducing any limitations thereto.

EXAMPLE 1

2,4-dichloro-6-dimethylamino-s-triazine

A solution of cyanuric chloride (276.6 g, 1.5 moles) in 700 ml of hot acetone was added at once to a slurry of 1,600 ml of water and 1,200 g of crushed ice. With stirring 25 percent aqueous dimethylamine solution (318 ml, 1.65 moles) was added over a 20 minute period at +5°, followed by a solution of sodium hydroxide (60 g. 1.5 moles) in 60 ml of water over a 20 minute period at 5°. The mixture was stirred for two hours at the same temperature, filtered, washed thoroughly with water and recrystallized from 2.4 l., of heptane, yielding 236 g (81.5%) of 2,4-dichloro-6-dimethylamino-s-triazine as lustrous colorless flakes, m.p. 121°–122°, (lit. m.p. 119°–120°).

EXAMPLE 2

2-(o-carbomethoxyanilino)-4-chloro-6-dimethylamino-s-triazine

A mixture of 2,4-dichloro-6-dimethylamino-s-triazine (97 g, 0.5 moles), of Example 1, methylanthranilate (151 g, 1 mole), anhydrous powdered potassium carbonate (138 g, 1 mole) and 1,500 ml of dioxane was heated at reflux for 20 hours. The hot reaction mixture was filtered and the residue washed with 200 ml of hot dioxane. The filtrates were cooled, the product filtered and washed with 150 ml of cold dioxane. After drying 101.9 g (66%) of 2-o-carbomethoxyanilino-4-chloro-6-dimethylamino-s-triazine, m.p. 185°–188° was obtained. Recrystallization from 1,000 ml of dioxane raised the melting point to 190°–191°.

Analysis Calculated for $C_{13}H_{14}ClN_5O_2$ (MW 307.74)
 Calculated: C, 50.73; H, 4.58; Cl, 11.52; N, 22.76
 Found: C, 50.86; H, 4.86; Cl, 11.77; N, 22.92.

EXAMPLE 3

2,4-bis(o-carbomethoxyanilino)-6-dimethylamino-s-triazine

A mixture of 2,4-dichloro-6-dimethylamino-s-triazine, (28.9 g, 0.15 moles), methyl anthranilate (54.5 g, 0.36 moles), powdered anhydrous sodium carbonate (42.4 g, 0.4 moles) and 600 ml of toluene was heated at relux with stirring for 70 hours. The hot reaction mixture was filtered and the salt residue washed with two 30 ml portions of toluene. After crystallization overnight at 0° the white precipitate was filtered, washed with four 25 ml portions of ethanol and dried overnight at 70° at 200 mm Hg, yielding 39.5 g. (62%) of white cyrstalline 2,4-bis(o-carbomethoxyanilino)-6-dimethylamino-s-triazine, m.p. 172°–173°. An analytical sample m.p. 173°–174° was obtained by recrystallization from dioxane-ethanol.

Analysis Calculated for $C_{21}H_{22}N_6O_4$ (MW 422.4)
 Calculated: C, 59.70; H, 5.25; N, 19.90
 Found: C, 59.59; H, 5.29; N, 19.87.

EXAMPLE 4

2-anilino-4-(o-carbomethoxyanilino)-6-dimethylamino-s-triazine

A mixture of 2-(o-carbomethoxyanilino)-4-chloro-6-dimethylamino-s-triazine (15.4 g, 50 moles) of Example 2, aniline 46.5 g, 0.5 moles), anhydrous sodium carbonate (21.2 g, 0.2 moles) and 300 ml of toluene was heated at reflux for 60 hours. The mixture was filtered and concentrated, yielding 55 g of orange oily material, which was diluted with 170 ml of methanol. Product which crystallized on standing for 3 days was filtered and washed with four 25 ml portions of methanol, yielding 14.3 g (78.5%) of 2-anilino-4-(o-carbomethoxyanilino)-6-dimethylamino-s-triazine, m.p. 142°–143°. Recrystallization from dioxanemethanol raised the melting point to 142.5°–144.5°.

Analysis Calculated for $C_{19}H_{20}N_6O_2$ (MW 364.41)
 Calculated: C, 62.62; H, 5.53; N, 23.07
 Found: C, 62.39; H, 5.32; N, 23.27.

EXAMPLE 5

2-anilino-4-(o-carboxyanilino)-6-dimethylamino-s-triazine

A mixture of 2-anilino-4-(o-carbomethoxyanilino)-6-dimethylamino-s-triazine, (5.0 g, 13.7 moles) and 50 ml of glacial acetic acid was heated at reflux overnight, cooled, and the white precipitate filtered, washed with methanol and dried, yielding 3.70 g (77%) of 2-anilino-4-(o-carboxyanilino)-6-dimethylamino-s-triazine, m.p. 291°–293°.

Analysis Calculated for $C_{18}H_{18}N_6O_2$ (MW 350.38)
 Calculated: C, 61.70; H, 5.18; N, 23.99

Found: C, 60.82; H, 5.07; N, 24,43.

EXAMPLE 6

2,4-bis(o-carbomethoxyanilino)-6-phenyl-s-triazine

A mixture of 2,4-dichloro-6-phenyl-s-triazine (4.52 g, 20 moles), methyl anthranilate (6.04 g, 40 moles) and anisole (50 ml) was refluxed for 4 hours. The clear yellow solution was cooled to 0°C and the crystalline product filtered and washed with acetone yielding 8.25 g (90.5% yield) of 2,4-bis-(o-carbomethoxyanilino)-6-phenyl-s-triazine, which after recrystallization from dioxane had a melting point of 195°–196°C.

Analysis Calculated for $C_{25}H_{21}N_5O_4$ (455.5)
  Calculated: C, 65.93; H, 4.65; N, 1538
  Found: C, 65.86; H, 4.53; N, 15.34.

The compounds of this invention are also useful in the preparation of dyestuff materials. This can be accomplished by nitration of the two benzenoid rings employing standard nitration reactions. The nitro groups are then reduced to amino groups which in turn are converted into diazo dyestuffs by known coupling reactions.

What is claimed is:

1. A compound of the formula

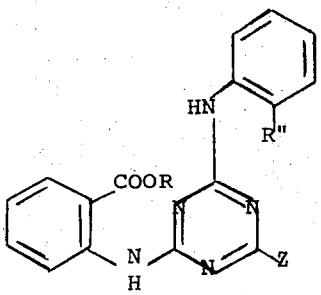

wherein R is hydrogen or a lower alkyl group,

Z is phenyl or $-NR'_2$ where R' is a lower alkyl group, and

R'' is hydrogen or —COOR.

2. The compound of claim 1 wherein Z is dimethylamino group, R is methyl and R'' is hydrogen.

3. The compound of claim 1 wherein Z is dimethylamino group, R'' is —COOR and both R groups are methyl.

4. The compound of claim 1 wherein Z is dimethylamino and R and R'' are hydrogen.

* * * * *